(12) United States Patent
Van Lieshout et al.

(10) Patent No.: US 9,769,833 B2
(45) Date of Patent: Sep. 19, 2017

(54) METHOD AND APPARATUS FOR HANDLING IN-DEVICE CO-EXISTENCE INTERFERENCE IN A USER EQUIPMENT

(75) Inventors: Gert Jan Van Lieshout, Staines (GB); Soeng-Hun Kim, Yongin-si (KR); Sudhir Kumar Baghel, Bangalore (IN); Venkateswara Rao Manepalli, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 18 days.

(21) Appl. No.: 13/882,435

(22) PCT Filed: Oct. 31, 2011

(86) PCT No.: PCT/KR2011/008222
§ 371 (c)(1),
(2), (4) Date: Apr. 29, 2013

(87) PCT Pub. No.: WO2012/057590
PCT Pub. Date: May 3, 2012

(65) Prior Publication Data
US 2013/0208711 A1 Aug. 15, 2013

(30) Foreign Application Priority Data
Oct. 29, 2010 (IN) .......................... 3237/CHE/2010

(51) Int. Cl.
*H04W 80/04* (2009.01)
*H04W 88/06* (2009.01)
(Continued)

(52) U.S. Cl.
CPC .......... *H04W 72/082* (2013.01); *H04B 1/406* (2013.01); *H04B 15/00* (2013.01);
(Continued)

(58) Field of Classification Search
CPC ..... H04W 80/04; H04W 88/06; H04W 28/04; H04W 72/04; H04W 72/0446; H04W 84/12
(Continued)

(56) References Cited

U.S. PATENT DOCUMENTS 6,665,760 B1 * 12/2003 Dotson ................. G06F 13/364
710/240
8,555,282 B1 * 10/2013 Kahn .................... G06F 9/4881
718/100
(Continued)

FOREIGN PATENT DOCUMENTS

CN 1842188 A 10/2006
CN WO 2010045822 * 4/2010 ............ H04W 88/06
(Continued)

OTHER PUBLICATIONS

MCC Support, Final Report of 3GPP TSG RAN WGI #61bis v1.0.0; R1-104271, Jun. 28-Jul. 2, 2010, Dresden, Germany.
(Continued)

*Primary Examiner* — Ronald B Abelson
(74) *Attorney, Agent, or Firm* — Jefferson IP Law, LLP

(57) ABSTRACT

A method and apparatus for handling in-device co-existence interference in a user equipment are provided. In an exemplary method, a Long Term Evolution (LTE) activity scheduled to be performed during an inactive time period of an LTE module in a user equipment is determined. It is determined whether the LTE module is to be allowed to perform the LTE activity during the inactive time period. If the LTE activity is to be allowed, then the LTE module is allowed to perform the LTE activity during the inactive time period. Otherwise, the LTE module is not allowed to perform the LTE activity during the inactive time period to provide interference free time for an Industrial, Scientific and Medical (ISM) module in the user equipment. Moreover, the
(Continued)

disallowed LTE activity is scheduled to be performed during an active time period following the inactive time period.

18 Claims, 7 Drawing Sheets

(51) Int. Cl.
| | |
|---|---|
| H04W 28/04 | (2009.01) |
| H04W 72/04 | (2009.01) |
| H04W 84/12 | (2009.01) |
| H04W 72/08 | (2009.01) |
| H04B 1/403 | (2015.01) |
| H04B 15/00 | (2006.01) |
| H04W 72/12 | (2009.01) |
| H04W 16/14 | (2009.01) |
| H04W 76/04 | (2009.01) |
| H04W 88/02 | (2009.01) |

(52) U.S. Cl.
CPC ... *H04W 72/1215* (2013.01); *H04B 2215/062* (2013.01); *H04W 16/14* (2013.01); *H04W 76/048* (2013.01); *H04W 88/02* (2013.01); *H04W 88/06* (2013.01)

(58) Field of Classification Search
USPC .......................................... 370/328, 329, 336
See application file for complete search history.

(56) References Cited

U.S. PATENT DOCUMENTS

| | | |
|---|---|---|
| 2009/0040990 A1 | 2/2009 | Xhafa et al. |
| 2009/0081962 A1 | 3/2009 | Sohrabi |
| 2009/0180451 A1 | 7/2009 | Alpert et al. |
| 2009/0296785 A1* | 12/2009 | Wu et al. ............... 375/132 |
| 2009/0303975 A1 | 12/2009 | Xhafa et al. |
| 2010/0144340 A1 | 6/2010 | Sudak |
| 2011/0243094 A1* | 10/2011 | Dayal et al. ............ 370/331 |
| 2013/0242919 A1* | 9/2013 | Koo .................... H04W 72/082 370/329 |

FOREIGN PATENT DOCUMENTS

| | | |
|---|---|---|
| WO | 2011-123535 A1 | 10/2011 |
| WO | 2012/019564 A1 | 2/2012 |
| WO | 2012/041255 A1 | 4/2012 |

OTHER PUBLICATIONS

Samsung, Possible TDM Solution for LTE, WiFi and BT In-device Coexistence, 3GPP TSG-RAN WG2 #71bis, R2-105572, Oct. 11-15, 2010, Xian, China.

"Discussion on in-device coexistence scenarios and solutions", 3GPP TSG-RAN WG2 #71, R2-104382, Aug. 23-27, 2010, Madrid, Spain.

Huawei et al., "Consideration on the details of in-device interference", 3GPP TSG-RAN WG2 Meeting #71bis, R2-105587, Oct. 11-15, 2010, pp. 1-4, Xian, China.

* cited by examiner

METHOD AND APPARATUS FOR HANDLING IN-DEVICE CO-EXISTENCE INTERFERENCE IN A USER EQUIPMENT

PRIORITY

This application is a National Stage application under 35 U.S.C. §371 of an International application filed on Oct. 31, 2011 and assigned application No. PCT/KR2011/008222, and claims the benefit under 35 U.S.C. §365(b) of an Indian patent application filed on Oct. 29, 2010 in the Indian Intellectual Property Office and assigned Serial No. 3237/CHE/2010, the entire disclosure of which is hereby incorporated by reference.

BACKGROUND OF THE INVENTION

1. Field of the Invention

The present invention relates to the field of wireless communication. More particularly, the present invention relates to handling in-device co-existence interference in a user equipment.

2. Description of the Related Art

Coexistence of Long Term Evolution (LTE) with Industrial, Scientific and Medical (ISM) (Bluetooth®, Wi-Fi®, and the like) band technologies and Global Navigation Satellite Systems (GNSS) is necessary as these are becoming very common combinations in User Equipments (UEs) such as cell phones. However, each of these technologies is developed by different groups to serve a specific purpose and thus the characteristics of each of these technologies are different. For example, they operate in different frequencies, have different access mechanisms, have different frame structures, have different peak transmit powers, and the like.

When all of these technologies operate simultaneously in an adjacent band (small separation e.g., <20 MHz), usually 50 decibel (dB) isolation is required. However, the small form factor of the UE provides only 10-30 dB isolation. As a result, the transmitter of one radio severely affects the receiver of another radio. For example, the small form factor of the UE may pose a great challenge of interference from transmission of ISM technology to the receiver of cellular technologies such as LTE or Worldwide Interoperability for Microwave Access (WiMax®). Similarly, the transmitter of cellular technology may cause severe interference to the ISM receiver. The main cause of in-device co-existence issues may be because of receiver blocking due to limited dynamic range of a power amplifier, an Analogue to Digital converter and out of band emission due to imperfect filtering.

LTE Coexistence with Bluetooth®

FIG. 1A is a schematic diagram illustrating separation between LTE and Bluetooth® channels according to the related art.

Referring to FIG. 1A, an LTE band 7 UpLink (UL) and Bluetooth® band are separated by 20 MHz. The band 7 is a Frequency Division Duplexing (FDD) band and hence the LTE receiver is not affected by the Bluetooth® transmitter. However, the LTE transmitter can affect the Bluetooth® receiver. Also, there is very negligible separation of 2 MHz between LTE band 40 (Time Division Duplexing (TDD) band) and the Bluetooth® frequency band. Therefore, it is not possible to discontinue using the higher portion of LTE band 40 in case of coexistence.

LTE Co-Existence with Wireless Fidelity (Wi-Fi®)

FIG. 1B is a schematic diagram illustrating separation between LTE and Wi-Fi® channels according to the related art.

Referring to FIG. 1B, there are 14 channels demarcated in an ISM band for a Wi-Fi® operation. Each channel is separated from another channel by 5 MHz with an exception of channel number 14 which is separated by 12 MHz. The first channel (i.e., channel 1) starts with 2401 MHz and hence there is almost no separation between LTE band 40 and Wi-Fi®. Channel 14 of Wi-Fi® ends at 2495 MHz so, theoretically, only 5 MHz separation is available between the LTE band 7 and the Wi-Fi®. Different countries have different policies for the number of allowed channels of Wi-Fi®. Currently, many countries allow only channels 1 to 13 whereas Japan allows usage of channel number 14 only for IEEE 802.11b based communication. This suggests that, even though in theory only 5 MHz separation is available between the Wi-Fi® and the LTE band 7, in practice at least 17 MHz is available.

Generally, in the Time Division Multiplexing (TDM) domain, a scheduling gap pattern is communicated between an evolved Node B (eNB) and a UE. The scheduling gap pattern consists of an active time period (e.g., an LTE ON period) and an inactive time period (e.g., an LTE OFF period). The scheduling gap pattern is communicated to the UE as Discontinuous Reception (DRX) cycle parameters or a bitmap, reduced Hybrid Automatic Repeat Request (HARQ) processes, and measurement gaps. Typically, an LTE module in a UE is configured to perform data transmission during the active time period indicated in the scheduling pattern so that an ISM module can operate during the inactive time period of the LTE module. Also, the eNB does not schedule DownLink (DL) data transmission to the UE during the inactive time period. This helps resolve in-device co-existence interference between the LTE module and the ISM module. Normally, the UE may perform other uplink LTE activities along with data transmission such as random access channel transmission, scheduling request transmission, channel quality indication report transmission, HARQ ACKnowledgment/Not-ACKnowledgment (ACK/NACK) transmission, Sounding Reference Signals (SRS) transmission, and the like. These LTE activities/procedures may coincide with the inactive time period reserved for the inference free operation of the ISM module, thereby causing interference to the ISM module operation.

Accordingly, there is a need for an improved method and apparatus for handling in-device co-existence interference in a user equipment.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for handling in-device co-existence interference in user equipment.

Another aspect of the present invention is to decrease in-device co-existence interference by providing a method and apparatus for handling in-device co-existence interference in user equipment.

In accordance with an aspect of the present invention, a method of handling in-device co-existence interference in a user equipment is provided. The method includes determining at least one Long Term Evolution (LTE) activity scheduled to be performed during an inactive time period of an LTE module in a user equipment, determining whether the at least one LTE module is to be allowed to perform the LTE activity during the inactive time period, if the at least one LTE module is to be allowed to perform the LTE activity during the inactive time period, allowing the LTE module to perform the at least one LTE activity during the inactive time period, and if the at least one LTE module is not to be allowed to perform the LTE activity during the inactive time period, disallowing the LTE module to perform the at least one LTE activity during the inactive time period to provide interference free time for an Industrial, Scientific and Medical (ISM) module in the user equipment.

In accordance with another aspect of the present invention, an apparatus for handling in-device co-existence interference in a user equipment is provided. The apparatus includes a processor, and a memory coupled to the processor, wherein the memory comprises an interference management module configured for determining at least one LTE activity scheduled to be performed during an inactive time period of an LTE module, for determining whether the at least one LTE module is to be allowed to perform the LTE activity during the inactive time period, for, if the at least one LTE module is to be allowed to perform the LTE activity during the inactive time period, allowing the LTE module to perform the at least one LTE activity during the inactive time period, and for, if the at least one LTE module is not to be allowed to perform the LTE activity during the inactive time period, disallowing the LTE module to perform the at least one LTE activity during the inactive time period to provide interference free time for an ISM module in the user equipment.

In accordance with another aspect of the present invention, a device for handling in-device co-existence interference in a user equipment is provided. The device includes an LTE module, an ISM module, and a coordinator coupled to the LTE module and the ISM module, wherein the coordinator is configured for determining at least one LTE activity scheduled to be performed during an inactive time period of the LTE module, for determining whether the at least one LTE module is to be allowed to perform the LTE activity during the inactive time period, for, if the at least one LTE module is to be allowed to perform the LTE activity during the inactive time period, allowing the LTE module to perform the at least one LTE activity during the inactive time period, and for, if the at least one LTE module is not to be allowed to perform the LTE activity during the inactive time period, disallowing the LTE module to perform the at least one LTE activity during the inactive time period to provide interference free time for the ISM module in the user equipment.

In accordance with yet another aspect of the present invention, a method of handling in-device co-existence interference between an LTE module and a Bluetooth module in a user equipment is provided. The method includes receiving a Semi-Persistent Scheduling (SPS) pattern for scheduling activity of the LTE module from an evolved Node B (eNB), aligning the activity of the Bluetooth module with the activity of the LTE module based on the SPS pattern, and performing uplink and downlink transmission/reception associated with the LTE module between the eNB and the user equipment as per the SPS pattern to provide interference free time to the Bluetooth module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
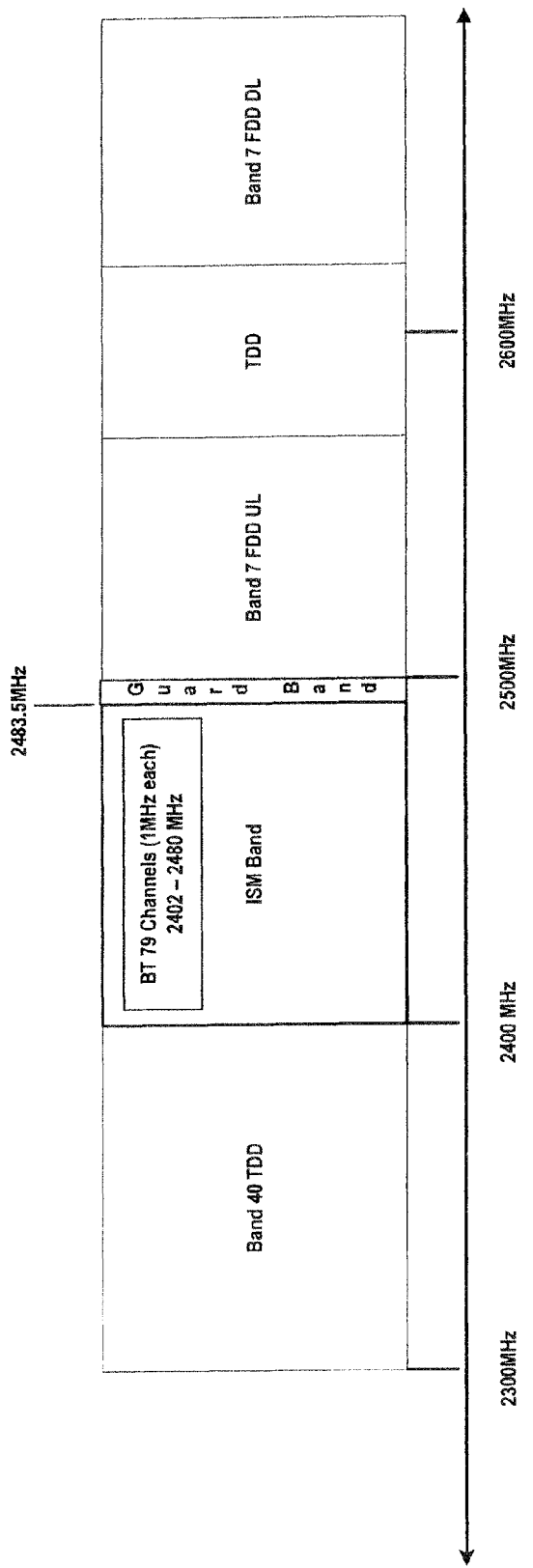
FIG. 1A is a schematic diagram illustrating separation between Long Term Evolution (LTE) and Bluetooth® channels according to the related art.
Figure 1B:
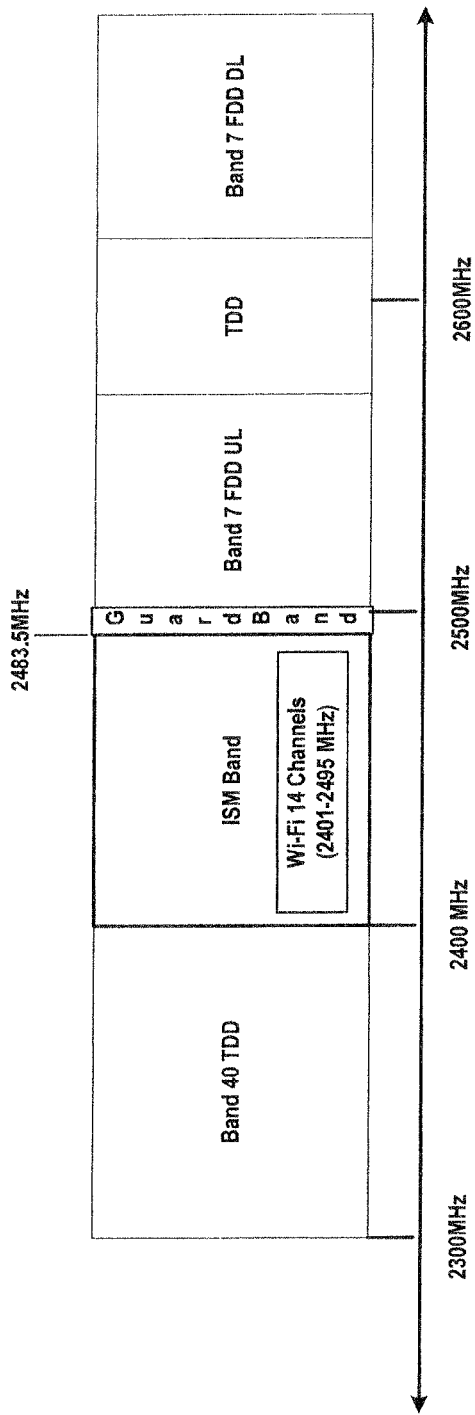
FIG. 1B is a schematic diagram illustrating separation between LTE and Wireless Fidelity (Wi-Fi®) channels according to the related art.
Figure 2:
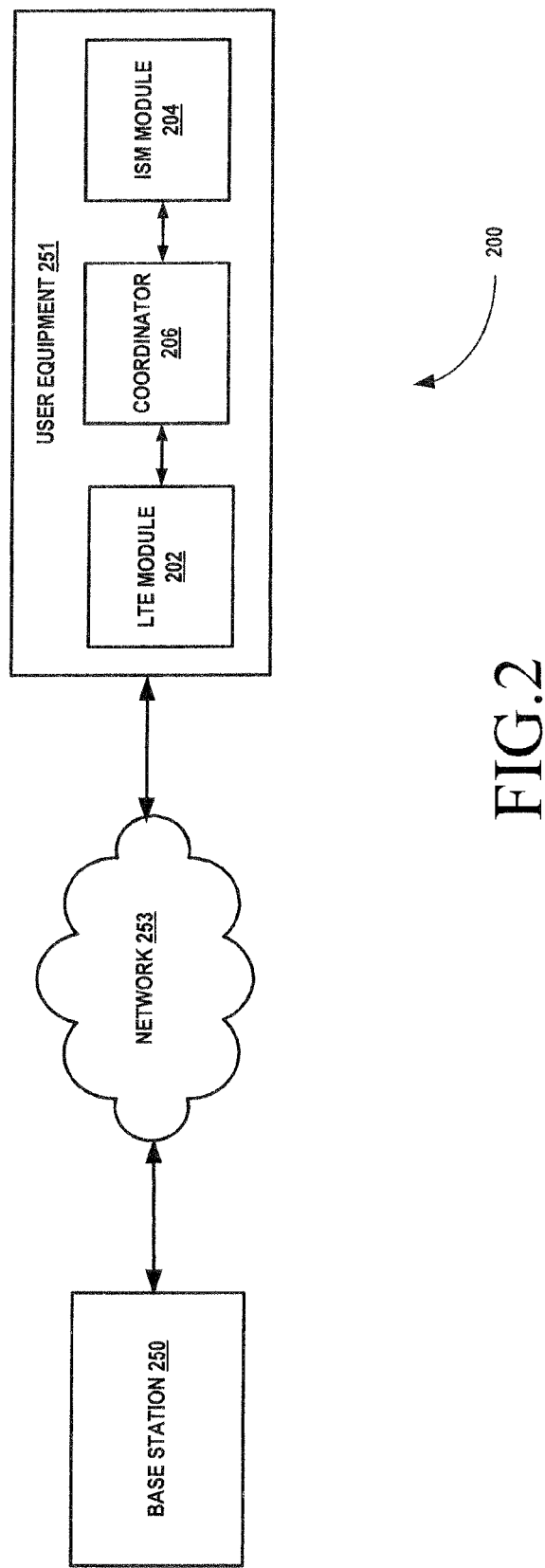
FIG. 2 illustrates a block diagram of a wireless communication system for handling in-device co-existence interference between an LTE module and an Industrial, Scientific and Medical (ISM) module in a user equipment according to an exemplary embodiment of the present invention.

FIG. 2 illustrates a block diagram of a wireless communication system for handling in-device co-existence interference between a Long Term Evolution (LTE) module and an Industrial, Scientific and Medical (ISM) module in a user equipment according to an exemplary embodiment of the present invention.

Referring to FIG. 2, the wireless communication system 200 includes a base station (e.g., an evolved Node B (eNB)) 250 and a User Equipment (UE) 251 connected via a wireless network (e.g., LTE network) 253. The UE 251 includes an LTE module 202, an ISM module 204, and a coordinator 206.

According to an exemplary embodiment, the coordinator 206 is configured for handling in-device co-existence interference between the LTE module 202 and the ISM module 204. The coordinator 206 handles in-device coexistence interference in at least two stages: 1) when the base station 250 and the UE 251 have not come to an agreement on handling the in-device co-existence interference, and 2) when the base station 250 and the UE 251 have come to an agreement on handling the in-device co-existence interference.

In the first stage, the UE 251 detects in-device co-existence interference and indicates the same to the base station 250. The base station 250 may configure the UE 251 for reporting in-device co-existence interference so that the UE 251 reports to the base station 250 regarding the presence of in-device co-existence interference. In that case, the base station 250 provides a response to the indication from the UE 251, the response indicating a configuration with which to mitigate the in-device co-existence interference and the related procedures.

For the UE 251 to successfully complete the related procedures, the LTE module 202 is to be protected from the interference caused by the ISM module 204. Thus, the coordinator 206 disallows the activity of the ISM module 204 in order to provide interference free time to the LTE module 202 for a pre-defined time period. For example, the co-ordinator 206 disallows the ISM module 204 to perform transmission and/or reception activity until the procedures are complete or for a limited time duration. During the pre-defined time period, the LTE module 202 can communicate the in-device coexistence interference between the ISM module 204 and the LTE module 202 to the base station 250 and complete the related procedures so that the base station 250 and the UE 251 come to an agreement on handling the in-device co-existence interference. Alternatively, the activity of the ISM module 204 can be time synchronized with the activity of the LTE module 202 so that both the LTE module 202 and the ISM module 204 are allowed to operate in an interference free manner.

When the eNB 250 and the UE 251 have come to an agreement, the eNB 250 communicates a scheduling gap pattern with LTE ON and OFF periods to the UE 251 so that the LTE module 202 and the ISM module 204 operate independently without causing interference to each other. Accordingly, the LTE module 202 performs data transmission/reception during the LTE ON period (hereinafter referred to as an active time period) and the ISM module 204 performs any ISM activity during the LTE OFF period (hereinafter referred to as inactive time period). In such case, the possibility of the LTE module 202 causing interference to the ISM module 204 or getting interfered with by the ISM module 204 is minimum. However, in-device co-existence interference may occur in the UE 251 when the LTE module 202 performs any LTE activity during the inactive time period reserved for performing the ISM activity. The LTE activity may include a Random Access CHannel (RACH) procedure, a Scheduling Request (SR) procedure, a Channel Quality Information (CQI) report transmission, a Sounding Reference Signals (SRS) transmission, and a Hybrid Automatic Repeat Request (HARQ) ACKnowledgment/Not-ACKnowledgment (ACK/NACK) transmission. In order to handle such interference, the coordinator 206 is configured to determine whether any LTE activity is scheduled to be performed or is ongoing during the inactive time period.

If any LTE activity is scheduled or ongoing, the coordinator 206 allows or disallows the LTE module 202 to perform the LTE activity during the inactive time period based on a priority associated with the LTE activity. For example, during the inactive time period, the coordinator 206 allows the LTE module 202 to perform a high priority LTE activity and deactivates the ISM module 204 so that the ISM module 204 does not cause any interference to the LTE module 202. In such a case, the coordinator 206 activates the ISM module 204 for performing any ISM activity during the remaining inactive time period upon completion of the LTE activity. Alternatively, the coordinator 206 disallows the LTE module 202 to perform a low priority LTE activity and allows the ISM module 204 to perform the ISM activity during the inactive time period. The coordinator 206 schedules the disallowed LTE activity during an active time period following the inactive time period.

Figure 3:
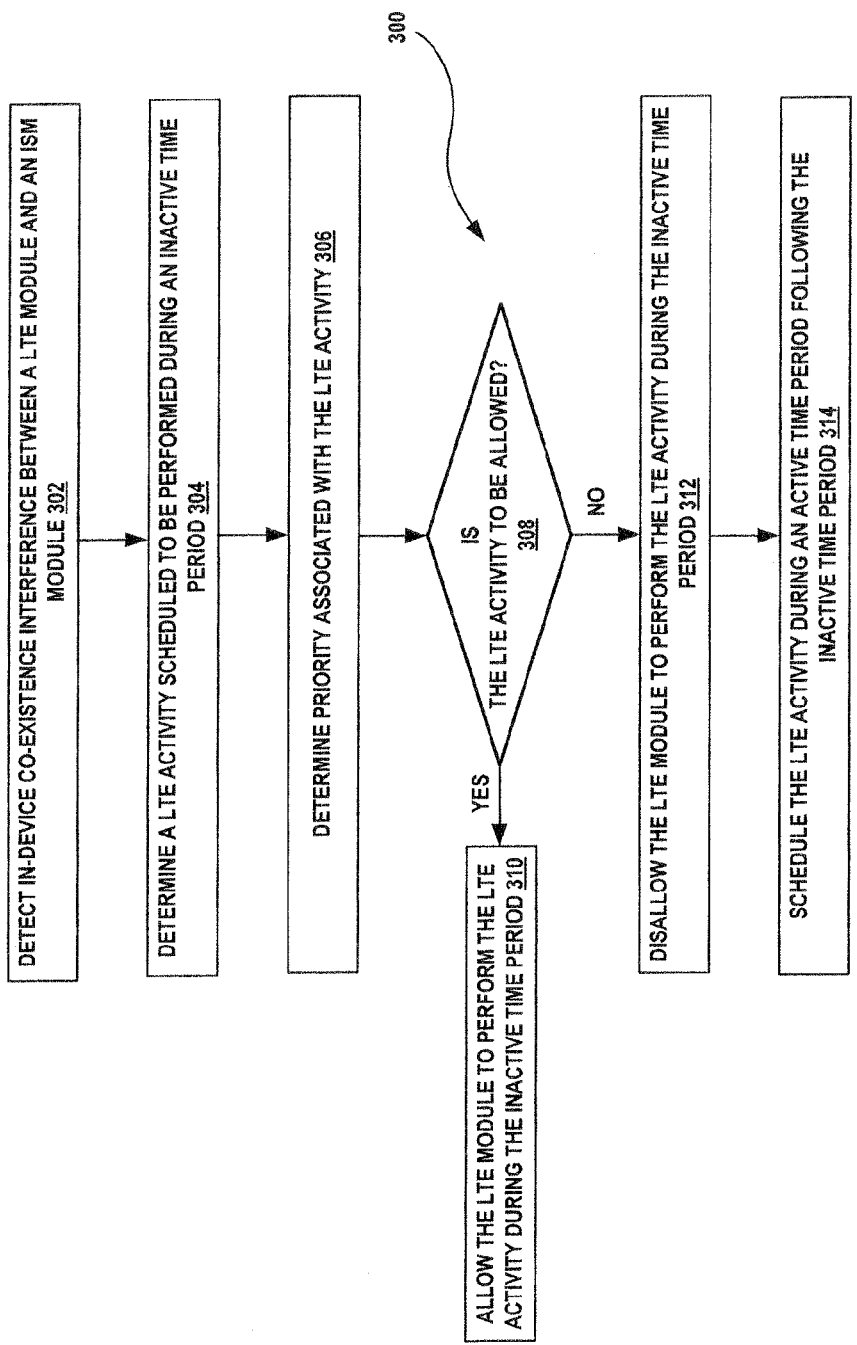
FIG. 3 is a process flowchart illustrating an exemplary method of handling in-device co-existence interference between an LTE module and an ISM module according to an exemplary embodiment of the present invention.

FIG. 3 is a process flowchart 300 illustrating a method of handling in-device co-existence interference between an LTE module and an ISM module according to an exemplary embodiment of the present invention.

Referring to FIG. 3, in-device co-existence interference between the LTE module 202 and the ISM module 204 is detected during an inactive time period at step 302. Upon detecting the in-device co-existence interference, the presence of in-device co-existence interference is communicated to the eNB 250 by the UE 251 so that both the eNB 250 and the UE 251 come to an agreement on handling the detected in-device co-existence interference at the UE 251. In an exemplary embodiment, the ISM module 204 is disallowed to perform any ISM activity while the LTE module 202 reports the presence of in-device co-existence interference and performs related procedures to mitigate the detected in-device co-existence interference so that no interference is caused to the LTE module 202 during this time period.

At step 304, it is determined that an LTE activity is scheduled or ongoing during the inactive time period. At step 306, a priority associated with the scheduled/ongoing LTE activity is determined. At step 308, it is determined whether the LTE module 202 is to be allowed to perform the schedule/ongoing LTE activity during the inactive time period based on priority of the LTE activity. If the LTE activity has a high priority, the LTE module 202 is allowed to perform the LTE activity during the inactive time period at step 310. If any ISM activity is ongoing, the ISM module 204 is deactivated so that the ISM module 204 does not cause interference to the LTE module 202. However, the ISM module 204 is activated when the LTE activity is completed so that the ISM module 204 can perform any ISM activity during the remaining inactive time period.

If the LTE activity has a low priority, the LTE module 202 is not allowed to perform the LTE activity during the inactive time period in order to provide interference free time to the ISM module 204 at step 312. Thus, during the inactive time period, the ISM module 204 is allowed to perform the ISM activity. At step 314, the LTE activity which is disallowed during the inactive time period is scheduled during an active time period following the inactive time period.

In accordance with the foregoing description, the LTE activity scheduled/ongoing may include RACH transmission, SR transmission, CQI report transmission, SRS transmission, and HARQ ACK/NACK transmission. The following description explains various case scenarios in which the LTE activity is scheduled or ongoing during an inactive time period.

In one example, consider that the LTE activity is an RACH transmission or an SR transmission that is scheduled to occur during an inactive time period. In an exemplary embodiment, the UE 251 is allowed to delay initiation of the RACH or SR transmission during the inactive time period when the SR or RACH transmission has a low priority. In another exemplary embodiment, if the RACH or SR transmission is associated with a high priority signaling activity, the LTE module 202 is allowed to perform the RACH or SR procedure during the inactive time period even if the ISM module 204 wishes to perform some ISM activity at the corresponding time. When the LTE module 202 performs the RACH or SR procedure, the ISM module 204 is deactivated to avoid ISM activity at the corresponding time. Further, the eNB 250 accepts the RACH or SR requests received from the UE 251 during the inactive time period. The UE 251 receives response messages to the RACH or UL grant for SR during an active time period following the inactive time period as per a currently running DRX cycle. Once the RACH or SR procedure is complete, the eNB 250 and the UE 251 consider a remaining inactive time period as a valid OFF period and avoid further LTE activity. The ISM module 204 is activated upon completion of the RACH or SR procedure and is allowed to perform ISM activity during the valid OFF period.

If the RACH or SR procedure is ongoing while the LTE module 202 transitions from the active time period to the inactive time period, the LTE module 202 is allowed to continue performing the RACH or SR procedure until completion of the RACH or SR procedure. Upon completion, the LTE module 202 transitions to the inactive time period for the remaining amount of OFF duration. The ISM module 204 is activated and is allowed to perform ISM activity for the remaining inactive time period. The above mentioned RACH procedure may be a contention free or a contention based RACH procedure. If the RACH procedure is a contention based RACH procedure, the UE 251 and the eNB 250 continue to perform the RACH procedure even when the inactive time period overlaps with a contention resolution timer value. Thus, when the contention resolution timer is running during the inactive time period, the ISM module 204 is not allowed to perform ISM activity. Alternatively, the contention resolution timer value can be scaled to the inactive time period so that the contention resolution procedure of the initiated RACH procedure is performed during a next active time period following the inactive time period thereby ensuring that the contention resolution timer is not expired during the inactive time period of the LTE module 202. In this case, the ISM module 204 is allowed to perform ISM activity during the inactive time period as no RACH procedure is performed during a corresponding time.

In another example, consider that the LTE activity is a CQI report transmission or an SRS transmission. While the UE 251 performs CQI measurement, a subframe that is at an offset in the past from the subframe where the actual CQI reporting is happening is considered as a reference subframe. If the reference subframe for CQI measurement falls in the LTE OFF period, the corresponding subframe is not considered as a valid reference subframe and a corresponding CQI report is not transmitted. Alternatively, if the UE 251 considers the reference subframe falling in the LTE OFF period as a valid reference subframe, the UE 251 performs CQI measurements and transmits the CQI report to the eNB 250.

In an exemplary embodiment, the UE 251 triggers a CQI report transmission or an SRS transmission as soon as the LTE module 202 goes to an active time period from the inactive time period (i.e., when the LTE module 202 is turned ON from an OFF state). Thus, the UE 251 is allowed to delay transmission of the CQI report or SRS. In another exemplary embodiment, the UE 251 sends a CQI report or an SRS transmission during the inactive time period even if the CQI reporting or SRS transmission has to be performed on a high priority basis. When the UE 251 performs CQI report or SRS transmission, the ISM module 204 is deactivated to avoid ISM activity at the corresponding time. Further, the eNB 250 accepts the CQI report or SRS requests received from the UE 251 during the inactive time period. Once the CQI or SRS transmission is complete, the eNB 250 and the UE 251 considers the remaining inactive time period as a valid OFF period (i.e., in-active time period). Hence, the ISM module 204 is activated upon completion of the CQI report or SRS transmission and is allowed to perform ISM activity during the valid OFF period.

In yet another example, consider the LTE activity to be a HARQ ACK/NACK transmission. If there is any data that is to be acknowledged before entering the inactive time period, the UE 251 and the eNB 250 perform HARQ ACK/NACK transmission during the inactive time period. During this time, the ISM module 204 is not allowed to perform any ISM activity. If the user equipment 251 does not receive a corresponding feedback for a UL transmission or re-transmission due to the inactive time period (i.e. LTE OFF period), the user equipment 251 considers the feedback to be positive (i.e., ACK) and allows an adaptive re-transmission to occur upon receiving a request from the eNB 250 to re-transmit the UL data after the LTE module 202 enters the active time period. Alternatively, the user equipment 251 may consider the corresponding feedback to be negative (i.e., NACK), in which case the user equipment 251 allows non-adaptive retransmission or adaptive retransmission after the LTE module 202 enters the active time period following the inactive time period.

In still another example, consider that the LTE activity is a Radio Link Monitoring (RLM) procedure, where the RLM procedure is performed during multiple active time period of a Discontinuous Reception (DRX) cycle when a single DRX cycle includes multiple active time periods. In other words, exemplary embodiments of the present invention provide a new DRX mechanism of multiple small ON time and OFF time, followed by longer ON or OFF time.

Figure 4:
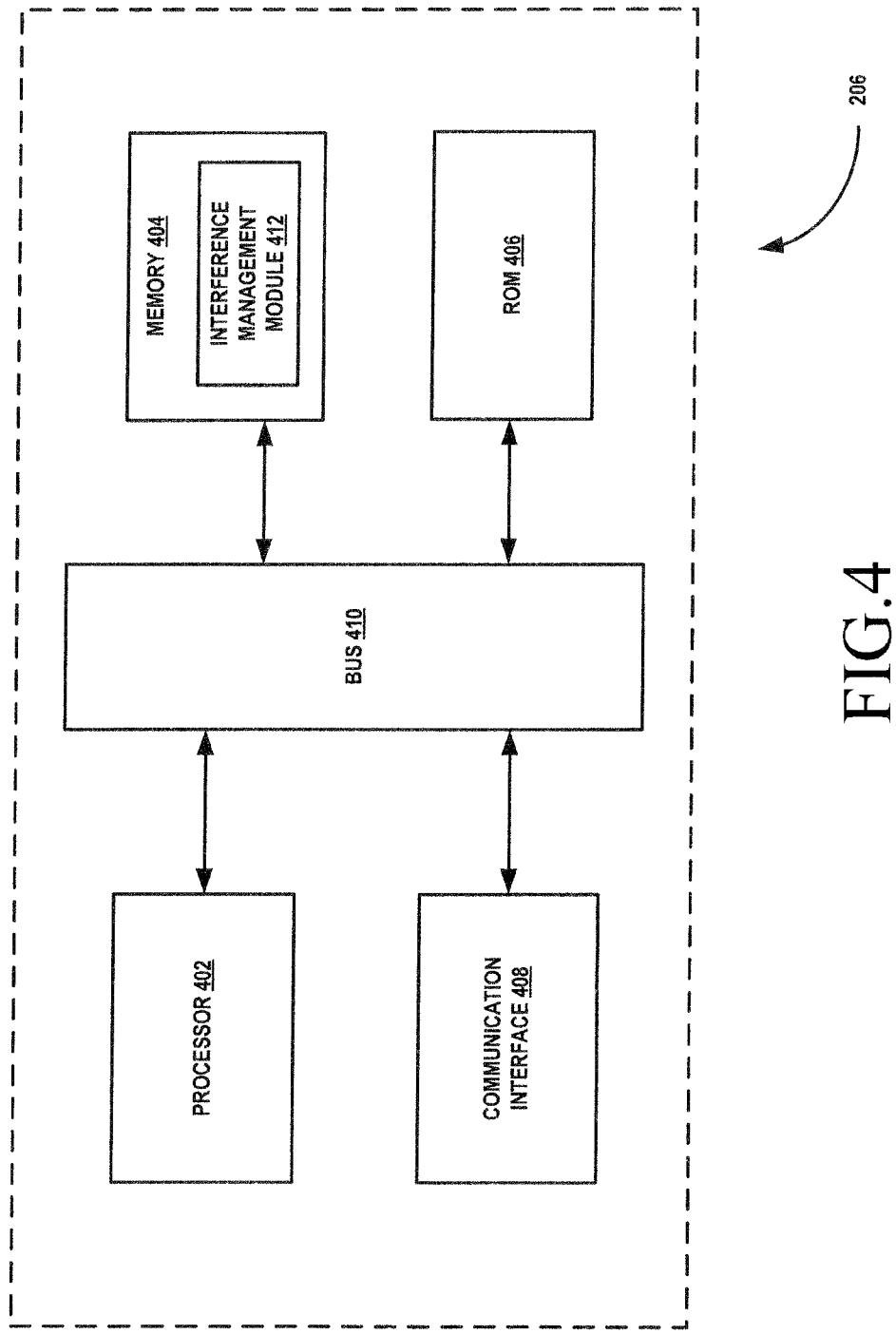
FIG. 4 illustrates a block diagram of a coordinator according to an exemplary embodiment of the present invention.

FIG. 4 illustrates a block diagram of a coordinator according to an exemplary embodiment of the present invention.

Referring to FIG. 4, the coordinator 206 includes a processor 402, a memory 404, a Read Only Memory (ROM) 406, a bus 410 and a communication interface 408.

The processor 402 may include any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

The memory 404 may be volatile memory and/or non-volatile memory. The memory 404 includes an interference management module 412 for handling in-device co-existence interference between the LTE module 202 and the ISM module 204, according to the exemplary embodiments illustrated in FIGS. 2 and 3. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Exemplary embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 402. For example, a computer program may include machine-readable instructions capable of handling in-device co-existence interference between the LTE module 202 and the ISM module 204, according to the teachings and herein described exemplary embodiments of the present subject matter. In one exemplary embodiment, the computer program may be included on a storage medium and loaded from the storage medium to a hard drive in the non-volatile memory.

Figure 5:
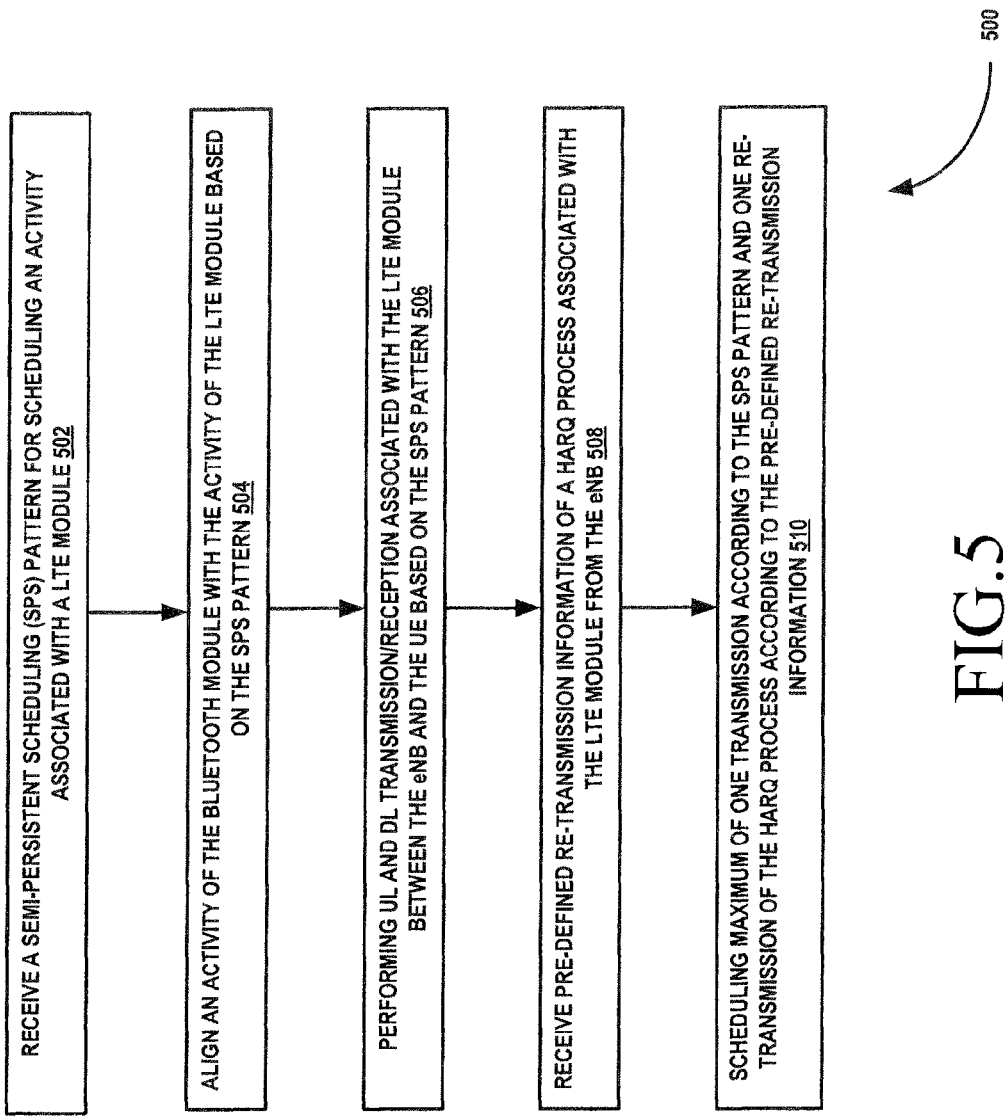
FIG. 5 is a process flowchart illustrating a method of handling in-device co-existence interference between an LTE module and a Bluetooth module according to an exemplary embodiment of the present invention.

FIG. 5 is a process flowchart 500 illustrating a method of handling in-device co-existence interference between an LTE module and a Bluetooth module according to an exemplary embodiment of the present invention.

Referring to FIG. 5, a Semi-Persistent Scheduling (SPS) pattern for scheduling activity of the LTE module 202 is received by the user equipment 251 from the eNB 250 at step 502. Typically, an LTE voice call is scheduled based on an SPS pattern. In an SPS pattern, relatively fixed DL and UL resources are given every 20 ms. The SPS is used where UL and DL sub frames are fixed and known to the user equipment 251 for a reasonably long time. Based on the SPS scheduling, the user equipment 251 can derive where a Bluetooth module (e.g., the ISM module 204) can operate.

At step 504, the activity of the Bluetooth module 204 is aligned with the activity of the LTE module 202 based on the SPS pattern. This ensures that if the SPS pattern is used for scheduling a voice call, no coexistence pattern is required to be exchanged between the user equipment 251 and the eNB 250. Thus, at step 506, the UL and DL data transmissions/receptions of the LTE module 202 are performed between the user equipment 251 and the eNB 250 based on the SPS pattern. As a result, in-device co-existence interference between the LTE module 202 and the Bluetooth module 202 is addressed.

Further, if there is a need for retransmission of Voice over Internet Protocol (VOIP) traffic, pre-defined re-transmission information of a HARQ process associated with the LTE module is received from the eNB 250 at step 508. This can be achieved in several ways such as a bit map or an index to a table of pattern or n+k sub frame, where k can be defined in a tabular form for each TDD configuration and for a particular subframe of a TDD configuration. At step 510, a maximum of one fresh transmission according to the SPS pattern and one fresh re-transmission of the HARQ process associated are performed according to the pre-defined re-transmission information. In case a second re-transmission has to be performed, the Bluetooth module 204 can compromise to miss one or more transmission opportunities in $T_{eSCO}$ interval(s) to accommodate the second retransmission of an LTE packet.

Figure 6:
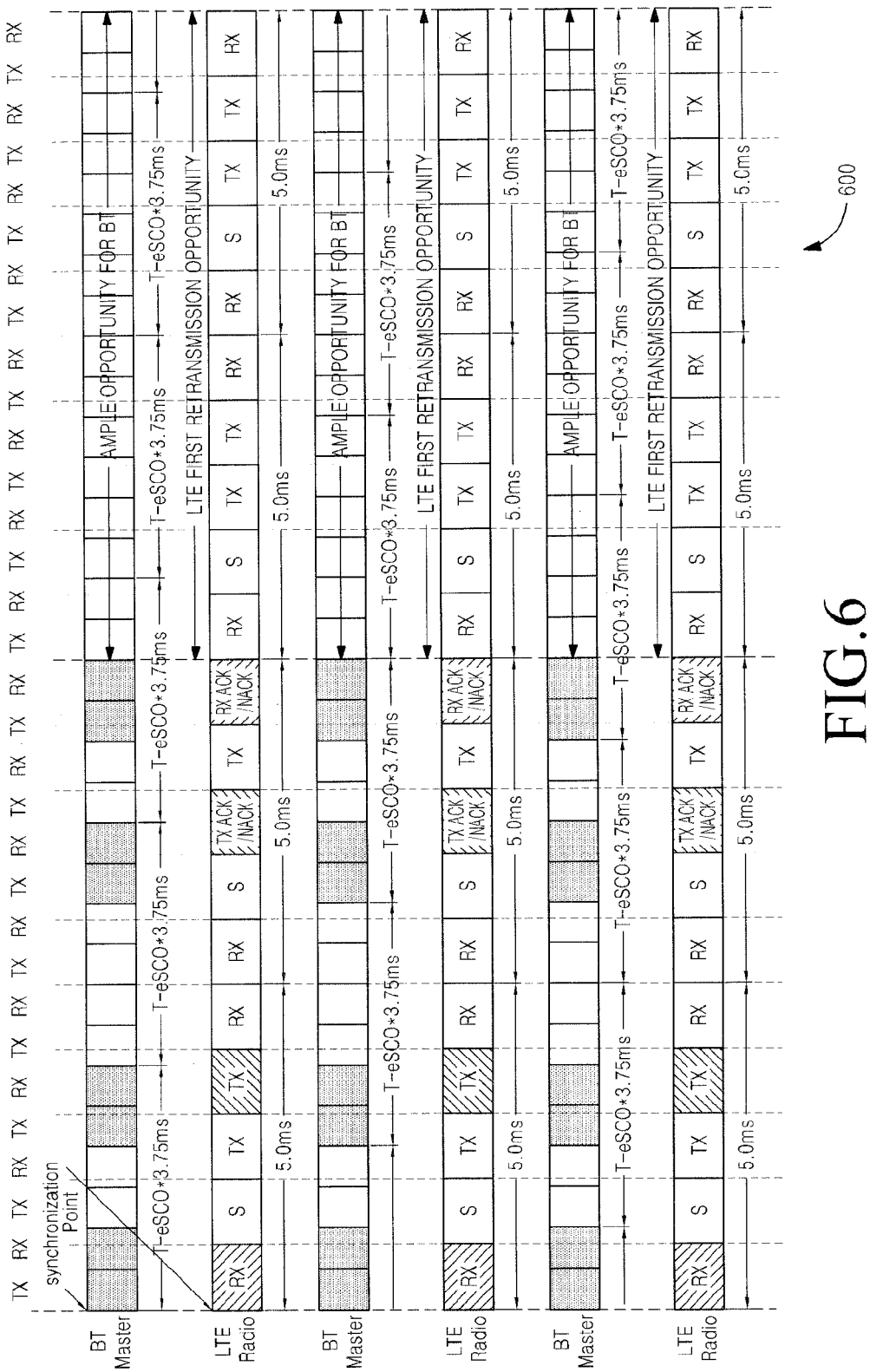
FIG. 6 is a schematic representation illustrating a time line indicating slots availed for LTE module operation and Bluetooth module operation according to an exemplary embodiment of the present invention.

FIG. 6 is a schematic representation illustrating a time line indicating slots availed for LTE module operation and Bluetooth module operation according to an exemplary embodiment of the present invention.

Referring to FIG. 6, a synchronization point is such that the Bluetooth module 204 aligns with a beginning of an LTE radio frame. The time line is shown for 60 ms as it is least common multiple of 3.75 ms and 20 ms.

The grey BT slots are not available for operation of the Bluetooth module 204, while the white BT slots are available for operation of the Bluetooth module 204. The grey BT slots are used for communicating LTE VOIP data and ACK/NACK. It can be seen that, there exist at least one Bluetooth transmission and reception opportunity in every $T_{eSCO}$ interval such that 64 Kbps data rate can be maintained. Sometimes two or three transmission/reception opportunities are present for the Bluetooth module 204 in every $T_{eSCO}$ interval. This is true for all TDD configurations. If there is a need for retransmission for VOIP traffic, then the first retransmission is performed based on the predefined re-transmission information in the next 10 ms frame following the initial transmission.

While the invention has been shown and described with reference to certain example embodiments thereof, it will be understood by those skilled in the art that various changes in form and details may be made therein without departing from the spirit and scope of the invention as defined by the appended claims and their equivalents.

The invention claimed is:

1. A method for handling in-device co-existence interference by a user equipment (UE), the method comprising:
    if an in-device co-existence interference between a first module and a second module in the UE is detected, transmitting, to an evolved Node B (eNB), information indicating the in-device co-existence interference;
    receiving, from the eNB, a response comprising an inactive time period of the first module determined based on the information, the inactive time period corresponding to an active time period of the second module;
    determining whether the first module is to be allowed to perform at least one activity during the inactive time period of the first module;
    if the first module is to be allowed to perform the at least one activity during the inactive time period of the first module, providing inactivity of the second module during the inactive time period of the first module; and
    receiving a response to the at least one activity which was performed by the first module during the inactive time period of the first module, from an eNB during an active time period of the first module following the inactive time period of the first module.

2. The method of claim 1, wherein the at least one activity is selected from a group consisting of a random access channel (RACH) procedure, a scheduling request (SR) procedure, a channel quality indication (CQI) report transmission, a sounding reference signals (SRS) transmission, and a hybrid automatic repeat request (HARQ) ACKnowledgment/Not-ACKnowledgment (ACK/NACK) transmission.

3. The method of claim 1, wherein the determining comprises:
   determining whether any activity is ongoing during the inactive time period of the first module.
4. The method of claim 1, wherein the determining comprises:
   determining a priority associated with the at least one activity scheduled during the inactive time period of the first module; and
   determining whether the first module is to be allowed to perform the at least one activity during the inactive time period of the first module based on the priority of the at least one activity.
5. The method of claim 1, wherein, if the first module is not allowed to perform the at least one activity during the inactive time period of the first module, the method further comprises allowing the first module to delay an initiation of at least one of a scheduling request (SR) procedure and a random access channel (RACH) procedure during the inactive time period of the first module.
6. The method of claim 1, wherein, if the first module is allowed to perform the at least one activity during the inactive time period of the first module, then the method further comprises:
   allowing the first module to continue performing an ongoing random access channel (RACH) procedure or an ongoing scheduling request (SR) procedure while the first module is transitioning from an active time period of the first module to the inactive time period of the first module, and
   wherein the ongoing RACH procedure or the ongoing SR procedure is initiated during the active time period of the first module.
7. The method of claim 6, wherein the allowing of the first module to continue performing the ongoing RACH procedure or the ongoing SR procedure while the first module is transitioning from the active time period of the first module to the inactive time period of the first module comprises:
   allowing the first module to continue with the ongoing RACH procedure during the inactive time period of the first module until a contention resolution timer expires.
8. The method of claim 1, wherein, if the first module is allowed to perform the at least one activity during the inactive time period of the first module, then the method further comprises:
   considering a reference subframe associated with a channel quality indication (CQI) measurement falling in the inactive time period of the first module as a valid reference subframe;
   performing the CQI measurement based on the reference subframe; and
   transmitting the CQI report associated with the CQI measurement to the eNB during the inactive time period of the first module.
9. The method of claim 1, wherein the allowing of the first module to perform the at least one activity during the inactive time period of the first module comprises:
   sending at least one (HARQ) ACKnowledgement/Non-ACKnowledgement (ACK/NACK) message to the eNB during the inactive time period of the first module.
10. An apparatus for handling interference in a user equipment (UE), the apparatus comprising:
   if an in-device co-existence interference between a first module and a second module in the UE by a controller is detected, a transmitter configured to transmit, to an evolved Node B (eNB), information indicating the in-device co-existence interference;
   a receiver configured to receive, from the eNB, a response comprising an inactive time period of the first module determined based on the information, the inactive time period corresponding to an active time period of the second module;
   a controller configured to:
      determine whether the first module is to be allowed to perform at least one activity during the inactive time period of the first module, and
      if the first module is not to be allowed to perform the at least one activity during the inactive time period of the first module, perform inactivity of the second module during the inactive time period of the first module,
   wherein the receiver is further configured to receive a response to the at least one activity which was performed by the first module during the inactive time period of the first module, from the eNB during an active time period of the first module following the inactive time period of the first module.
11. The apparatus of claim 10, wherein the at least one activity is selected from a group consisting of a random access channel (RACH) procedure, a scheduling request (SR) procedure, a channel quality indication (CQI) report transmission, a sounding reference signals (SRS) transmission, and a hybrid automatic repeat request (HARQ) ACKnowledgment/Not-ACKnowledgment (ACK/NACK) transmission.
12. The apparatus of claim 10, wherein the controller is further configured to determine whether any activity is ongoing during the inactive time period of the first module.
13. The apparatus of claim 10, wherein the controller is further configured to:
   determine a priority associated with the at least one activity scheduled during the inactive time period of the first module; and
   determine whether the first module is to be allowed to perform the at least one activity during the inactive time period of the first module based on the priority of the at least one activity.
14. The apparatus of claim 10, wherein, if the first module is not allowed to perform the at least one activity during the inactive time period of the first module, then the controller is further configured to allow the first module to delay an initiation of at least one of a scheduling request (SR) procedure and a random access channel (RACH) procedure during the inactive time period of the first module.
15. The apparatus of claim 10, wherein, if the first module is allowed to perform the at least one activity during the inactive time period of the first module, then the controller is further configured to allow the first module to continue performing an ongoing random access channel (RACH) procedure or an ongoing scheduling request (SR) procedure while the first module is transitioning from an active time period of the first module to the inactive time period of the first module, and
   wherein the ongoing RACH procedure or the ongoing SR procedure is initiated during the active time period of the first module.
16. The apparatus of claim 15, wherein, when the controller allows the first module to continue performing the ongoing RACH procedure or the ongoing SR procedure while the first module is transitioning from the active time period of the first module to the inactive time period of the first module, the controller is further configured to allow the first module to continue with the ongoing RACH procedure during the inactive time period of the first module until a contention resolution timer expires.

17. The apparatus of claim 10, wherein, if the first module is allowed to perform the at least one activity during the inactive time period of the first module, then the controller is further configured to:
consider a reference subframe associated with a channel quality indication (CQI) measurement falling in the inactive time period of the first module as a valid reference subframe;
perform the CQI measurement based on the reference subframe; and
transmit the CQI report associated with the CQI measurement to an evolved Node B during the inactive time period of the first module.

18. The apparatus of claim 10, wherein when the controller allows the first module to perform the at least one activity during the inactive time period of the first module, the controller is further configured to control a transmitter to send at least one (HARQ) ACKnowledgment/Not-ACKnowledgment (ACK/NACK) message to an evolved Node B during the inactive time period of the first module.

* * * * *